: 2,988,530
Patented June 13, 1961

2,988,530
COMPOSITIONS COMPRISING BLENDS OF VINYL CHLORIDE POLYMERS WITH ALPHA-METHYL-STYRENE/ACRYLONITRILE/STYRENE INTERPOLYMERS

Robert J. Slocombe and Ival O. Salyer, Dayton, Ohio, assignors to Monsanto Chemical Company, St. Louis, Mo., a corporation of Delaware
No Drawing. Filed Sept. 10, 1954, Ser. No. 455,368
19 Claims. (Cl. 260—31.8)

This invention relates to novel polymer blends. In some of its aspects the invention relates to polyvinyl chloride having improved properties by virtue of being blended with interpolymers of α-methylstyrene, acrylonitrile and styrene. The invention in general relates to compositions of the type obtained by blending vinyl chloride polymers with a comparatively small quantity of an interpolymer comprising styrene and acrylonitrile, wherein the improvement is obtained by incorporating α-methylstyrene in the styrene/acrylonitrile interpolymer. Some specific aspects of the invention relate to the art of fabricating films from polymeric compositions, which compositions have unusual film-forming properties and which films have flexibility and resilience without brittleness. The invention is directed to blended polymer compositions which have properties quite distinct from the properties of the individual components.

Copolymers of acrylonitrile and styrene, for example the polymers of from 15 to 40 percent of acrylonitrile and from 60 to 85 percent styrene, are well-known to the art. These compositions have their primary utility in the field of molding compositions, but because they have slight tensile elongations, films processed therefrom are so brittle that they have no practical applications.

Polyvinyl chloride and copolymers of substantial proportions of vinyl chloride, for example 85 percent vinyl chloride and minor proportions of other copolymerizable monomers, are also well known to the art and are widely used in film formation. These compositions are useful because of their processability, resistance to combustion and their insolubility in water and many organic solvents, but are not satisfactory in the preparation of films with substantial rigidity or resilience. The vinyl chloride polymers to be processable must contain substantial portions of liquid plasticizers, and when so compounded are too weak and flabby for use in the manner contemplated by the present invention. To prepare vinyl chloride films without plasticizers is not feasible, because of the excessive brittleness of the product so prepared, and because the vinyl chloride polymers are seriously degraded by the necessary mechanical operations.

It has been found, as disclosed in our copending application Serial No. 280,400 filed April 3, 1952, and as also disclosed in U.S. Patent No. 2,646,417, that by physically mixing or blending vinyl chloride polymers with styrene-acrylonitrile copolymers plastic compositions quite unlike either of the components can be prepared. While both of the blended components are brittle, the mixture is strong and tough. The vinyl chloride polymer, unless loaded with plasticizers cannot be calendered without degradation taking place, whereas the blend may be processed readily into films without the use of plasticizers thereby avoiding the weakness and softness inherent in plasticized compositions. The styrene/acrylonitrile copolymer is a good molding resin but it cannot be formed into films due to its brittleness and lack of processability. The blends of the two types of polymers have none of the disadvantages of the individual components but possess unusual processability being capable of conventional calendering operations, and having flexibility and resilience with desirable tensile strength and tensile elongation.

It is a purpose of the present invention to provide improvements in polymer blends of the vinyl chloride polymer-styrene/acrylonitrile copolymer type just described. By use of α-methylstyrene in addition to styrene and acrylonitrile in the copolymer, final blends with polyvinyl chloride are achieved which have improved clarity and color, greater tensile strength and/or greater tensile elongation, often better flexural strength, and often greater transition range. The blends have excellent processability. In the practice of this invention, vinyl chloride polymers are blended with interpolymers made by subjecting to interpolymerization a monomeric material comprising styrene and acrylonitrile plus α-methylstyrene. Comonomers in addition to these three named comonomers can be used in making the interpolymer if desired, provided they are of such nature and in such quantity as not to affect adversely the desirable properties imparted to the blends of the interpolymers with polyvinyl chloride.

While it is permissible to blend any proportions, such as 1 to 99 percent of either polymer, of a vinyl chloride polymer with an α-methylstyrene/acrylonitrile/styrene interpolymer, usually the blend will contain a major proportion, i.e., more than 50 weight percent, of the vinyl chloride polymer, and the most useful blends ordinarily are obtained by intimately admixing until a homogeneous mass is formed from 75 to 99 parts by weight vinyl chloride polymer with correspondingly from 25 to 1 parts by weight of the interpolymer. The preferred blends of the invention comprise from 85 to 98 parts by weight vinyl chloride polymer plus from 15 to 2 parts by weight of the α-methylstyrene/acrylonitrile/styrene interpolymer.

It is a great advantage of the present invention that the blend can be composed solely of the vinyl chloride polymer plus the interpolymer, without the presence of any liquid plasticizer. Such blends are readily processable and can be formed into very satisfactory films and other shapes and objects by conventional calendering and molding operations not possible to perform upon the vinyl chloride polymer alone. Such unplasticized blends can, of course, contain any desired added materials such as dyes, pigments, stabilizers against heat decomposition, finely divided inorganic or organic fillers, and the like. The invention also contemplates, however, the use of a suitable plasticizer, for example dioctyl phthalate, e.g., di(2-ethylhexyl) phthalate, in the blends. The plasticized compositions have a much different character than the unplasticized. They generally have not only a considerably broader transition range, but also the temperature at which they change from a stiff rigid solid to a rubbery solid and the temperature at which they change from such state into a material having very little strength and corresponding approximately to the softening point, are lower. These changes, which are desirable for certain purposes, are accompanied by a decrease in the strength properties of the blend. A suitable quantity of dioctyl phthalate is, for example, from 10 to 60 parts by weight dioctyl phthalate per 100 parts by weight of the polymer blend. Such plasticized compositions can also contain any of the added materials just mentioned with respect to the unplasticized compositions. While in the present specification and claims compositions are described as containing certain materials in parts by weight, or weight percentages, it is to be understood that these values are not exclusive of other unnamed materials unless definitely indicated to be so. The blends of the present invention, both unplasticized and plasticized, show generally the same type of behavior as the corresponding blends of vinyl chloride polymers with styrene/acrylonitrile copolymers, but have a number of marked advantages due to the use of α-methylstyrene, as has been mentioned and as will become apparent.

In the practice of this invention, usually the principal resin used in the blends is polyvinyl chloride, i.e., a homopolymer of vinyl chloride, or a copolymer of vinyl chloride with another mono-olefinic comonomer copolymerizable therewith, for example vinyl acetate, diethyl fumarate, diethyl maleate, or vinylidene chloride. The vinyl chloride resin will comprise over 50 parts by weight vinyl chloride and less than 50 parts by weight of any comonomer, and preferably is at least 85 weight percent vinyl chloride and up to 15 percent of one or more comonomers. Those skilled in the art are fully familiar with the wide variety of vinyl chloride polymers, and any of those may be used in the practice of the present invention provided it is a tough high molecular weight polymer. Naturally, the characteristics of the final blend will be somewhat dependent upon the presence or absence of comonomers in the vinyl chloride polymer. By way of example of suitable vinyl chloride polymers there can be mentioned all of those described in U.S. Patent No. 2,646,417. The art is fully familiar with various methods of making satisfactory vinyl chloride polymers, and these of course include mass polymerization, solvent polymerization, emulsion polymerization, and suspension or "pearl" polymerization. Polymer made by any of these or other suitable methods can be used in the practice of the invention, although suspension and emulsion polymerization are generally more favored in the commercial production of vinyl chloride polymers.

The chosen vinyl chloride polymer is blended with an interpolymer containing α-methylstyrene, acrylonitrile and styrene in proportions now to be discussed. Most of the interpolymers suitable for the practice of the invention contain the named materials as follows, the numerals indicating parts by weight.

| | |
|---|---|
| α-Methylstyrene | 2 to 50 |
| Acrylonitrile | 10 to 40 |
| Styrene | 10 to 88 |

Generally more satisfactory interpolymers are made with amounts of acrylonitrile and correspondingly styrene within narrower limits, viz.

| | |
|---|---|
| α-Methylstyrene | 2 to 50 |
| Acrylonitrile | 10 to 40 |
| Styrene | 17 to 81 |

The interpolymers which generally give the best properties to the final blends with the vinyl chloride polymers, and thus constitute the preferred interpolymers of the invention, contain α-methylstyrene, acrylonitrile and styrene in the following weight proportions:

| | |
|---|---|
| α-Methylstyrene | 2 to 40 |
| Acrylonitrile | 17 to 33 |
| Styrene | 27 to 81 |

In all of the above ranges of values, the sum of the parts by weight of the three named compounds as present in the interpolymer total 100. In other words, the values above are weight percent, taking 100 weight percent as the total of the α-methylstyrene/acrylonitrile/styrene independently of the presence or absence of other materials. By way of example, if an interpolymer is to be used which has the minimum of 2 parts by weight α-methylstyrene and 10 parts by weight acrylonitrile, the styrene is present in the amount of 88 parts by weight. As another example, an interpolymer containing 20 parts by weight α-methylstyrene and 30 parts by weight acrylonitrile will contain 50 parts by weight styrene.

It is interesting to note that the α-methylstyrene/acrylonitrile/styrene interpolymers found most useful in the invention have compositions of the three named compounds, the proportions of which lie in a band generally running along a line which may be called the "azeotropic line," which term will now be defined. To determine the "azeotropic line," a triangular coordinate graph is set up which is an equilateral triangle divided off by three series of parallel lines, each series being parallel to one side of the triangle. The distance between an apex of the triangle and the side opposite that apex represents variations in percentages of the component designated by that apex varying from 100 percent to 0 percent in equal increments running from the apex to the opposite side of the triangle. For example, if the distance between the apex and the side of the triangle opposite the apex is divided into 100 equal parts by lines passing across the triangle and parallel to said side, each part represents 1 percent of the component for which that apex is designated. Thus, any point within the triangle represents a single 3-component composition, the indicated percentages of the three components totaling 100 percent.

Before describing the method of establishing the "azeotropic line" on the triangular coordinate graph, it will be well to define what is meant by the term "binary polymerization azeotrope." This term is well known in the art, and a detailed discussion thereof can be found in any suitable treatise on copolymerization. See for example, "Copolymers," by Alfrey, Bohrer and Mark, Interscience Publishers, Inc., 1952. When a pair of monomers is subjected to copolymerization, the rate at which the two individual monomers polymerize is usually different. A large proportion of possible pairs of monomers are incapable, because of their respective reactivity ratios, of forming under any conditions an instantaneous polymer having the same composition as the monomeric mixture from which it is formed. However, there are certain monomer pairs which, in a proportion characteristic of that pair, give a copolymer having the same composition as the particular monomeric mixture. In such instance, a batch polymerization can be carried out with a monomeric mixture of particular composition with a resultant homogeneous copolymer containing the same relative proportions of the monomers as in the initial monomeric reaction mixture. This composition is known as the "binary polymerization azeotrope composition." In the case of the acrylonitrile/styrene pair, the binary polymerization azeotrope composition is approximately 24 weight percent acrylonitrile, 76 weight percent styrene. In the case of the acrylonitrile/α-methylstyrene pair, the binary polymerization azeotrope composition is approximately 30 weight percent acrylonitrile, 70 weight percent α-methylstyrene.

Now, applying the foregoing, a triangular coordinate graph is set up for the α-methylstyrene/acrylonitrile/styrene terpolymer, each apex of the graph being designated as 100 percent of one of these monomers. Now the polymerization azeotrope composition of the acrylonitrile/styrene pair is located on the graph, as is the polymerization azeotrope composition of the acrylonitrile/α-methylstyrene pair. (Styrene and α-methylstyrene do not form a polymerization azeotrope.) Now a straight line is drawn between these two compositions, and this line is herein termed the "azeotropic line." As disclosed and claimed in the copending application of George L. Wesp and Robert J. Slocombe, Serial No. 396,481, filed December 7, 1953, now Patent No. 2,851,446, terpolymers made by batch polymerization of monomeric mixtures whose compositions lie on and near this "azeotropic line" are clear and homogeneous whereas those made from monomeric mixtures whose compositions lie farther away from the line on either side of the line are turbid or opaque. In blends of the present invention, we have found that certain of the physical properties of the polyvinyl chloride blends are at their maximum if the α-methylstyrene/acrylonitrile/styrene interpolymer blended with the polyvinyl chloride has a composition lying on or near the azeotropic line. This is particularly marked in the case of the tensile elongation, as shown in Example 3 below.

As in the case of the vinyl chloride polymer as described above, the α-methylstyrene/acrylonitrile/styrene interpolymers can be made by any of the known polymerization procedures, such as mass (bulk) solvent, emulsion or suspension polymerization, so long as the interpolymers are tough high molecular weight products. As shown in the examples below, benefits of the invention are obtained both with emulsion polymerized and with mass polymerized interpolymers.

In preparing the interpolymers used in the present invention, any part or all of the styrene called for can be substituted by any one of the vinyl toluenes or mixtures thereof, which are equivalents of styrene for the purposes of the present invention.

The blended compositions of this invention are prepared, with or without plasticizers, by the use of any conventional plastic mixing apparatus. Although roll mills and conventional dough mixtures may be used, more satisfactory practice involves the use of Banbury mixers or equivalent types of rubber mixing machinery. Once a thorough mixing of the compositions has taken place, the mixture even without plasticizer is then readily processed in conventional types of calenders wherein the compositions, quite unlike the individual components, may be rolled into very thin films which have the characteristic physical properties described herein.

In addition to "mechanical blends" of the vinyl chloride polymer with the α-methylstyrene/acrylonitrile/styrene interpolymer, the invention contemplates "polymerization blends" obtained by polymerizing vinyl chloride (with or without comonomer) in the presence of preformed α-methylstyrene/acrylonitrile/styrene interpolymer, or obtained by polymerizing a monomeric mixture of α-methylstyrene, acrylonitrile and styrene in the presence of preformed vinyl chloride polymer. Such polymerization blends can be made by any of the polymerization techniques mentioned hereinbefore, and often show increased compatibility.

The new plastic compositions are subject to a wide variety of uses, but of particular importance are the uses in applications requiring substantial tensile strength and tensile elongation without brittleness when fabricated in thin sections. The principal property of the thin films which can be fabricated from the new polymeric compositions is the rigidity or resilience as distinguished from the soft flabby characteristics of conventional calendered films. The compositions are also useful in fabricating plastic tubing, phonograph records and floor covering, for coating of fabrics, and for embossing.

Some of the advantages of the invention are illustrated by the following examples. However, it will be understood that variations from specific percentages of the various components of the interpolymers and the relative proportions of interpolymer and vinyl chloride polymer, and other details, can be made without departing from the invention in its broadest aspects.

EXAMPLE 1

Blends of 90 parts by weight polyvinyl chloride with 10 parts by weight of mass polymerized and emulsion polymerized interpolymer of styrene and acrylonitrile, or of various interpolymers of styrene, acrylonitrile and α-methylstyrene, were prepared by mechanical blending of the polyvinyl chloride with the interpolymers on heated mill rolls. Test samples of the various blends were then compression molded, and the physical properties determined as reported in Table I.

*Table I*

UNPLASTICIZED BLENDS OF 90% POLYVINYL CHLORIDE WITH 10% COPOLYMERS OR TERPOLYMERS

| Interpolymer Composition, Wt. Percent of Monomeric Components | | | Tensile Strength,[1] p.s.i. | | Tensile[1] Elong., Percent (Failure) | Flexural Strength, p.s.i. | Impact Strength, ft. lbs./in. notch | Clash-Berg, °C. | | |
|---|---|---|---|---|---|---|---|---|---|---|
| αMS | AN | S | Yield[2] | Failure | | | | $T_f$ | $T_{2000}$ | Stifflex Range |
| ------ | 28 | 72 | 8,041 | 6,674 | 39.6 | [3] 14,346 | .61 | 76.2 | 92.6 | 16.4 |
| 5 | 25 | 70 | 8,263 | 6,534 | 24.0 | [4] 15,153 | .63 | 74.1 | 92.5 | 18.4 |
| 10 | 30 | 60 | 8,299 | 7,372 | 29.1 | [3] 15,480 | .52 | 76.9 | 98.9 | 22.0 |
| 20 | 30 | 50 | 8,127 | 7,248 | 35.4 | [3] 15,179 | .49 | 75.5 | 95.1 | 19.6 |

αMS = α-Methylstyrene.
AN = Acrylonitrile.
S = Styrene.
[1] Crosshead speed 0.2 inch per minute.
[2] Not all specimens yielded.
[3] No failure.
[4] Failed.

The last three lines of data in Table I should be compared with the first line of data which gives the physical properties for the blend containing the copolymer of styrene with acrylonitrile. The proportions of styrene and acrylonitrile used, viz. 72 percent and 28 percent, were determined to be the proportions giving the best physical properties when 90 parts by weight polyvinyl chloride was blended with 10 parts by weight of styrene/acrylonitrile copolymers in which the proportion of styrene to acrylonitrile was varied.

From the data in Table I, it will be seen that while the interpolymers containing 5, 10, or 20 weight percent α-methylstyrene gave blends with polyvinyl chloride having the same general character as those without the α-methylstyrene, several of the physical properties are markedly improved. Thus, the α-methylstyrene-containing blends in each instance had a greater transition range as determined by the Stifflex range in the Clash-Berg test. The tensile strength at yield was higher in each instance of the use of α-methylstyrene as compared with the blends containing no α-methylstyrene. Similarly, the 10 and 20 percent α-methylstyrene blends (the percentages of course referring to the α-methylstyrene in the terpolymer, and not in the total blend with the polyvinyl chloride), showed markedly higher tensile strength at failure. All of the α-methylstyrene products had a higher flexural strength than the products without α-methylstyrene, indicating less brittle material. The tensile elongations and impact strengths were generally somewhat lower than in the case of the blends without α-methylstyrene.

Another outstanding feature of the use of α-methylstyrene in the interpolymer with styrene and acrylonitrile, which interpolymer is blended with polyvinyl chloride, is the much better color and clarity thus obtained in the polyvinyl chloride blend, as compared with the blend of polyvinyl chloride with the same percentage of the styrene/acrylonitrile copolymer free from α-methylstyrene.

The blends of this example exhibited excellent processability.

EXAMPLE 2

In this example, the same polyvinyl chloride and the same styrene/acrylonitrile copolymer and α-methylstyrene/acrylonitrile/styrene interpolymers, as used in Example 1, were blended together, but additionally there was present in the blend 24 percent by weight, based on the final polyvinyl chloride-interpolymer-plasticizer blend, of dioctyl phthalate plasticizer. Thus, each of these blends contained 66 parts by weight polyvinyl chloride, 24 parts by weight dioctyl phthalate, and 10 parts by weight styrene/acrylonitrile copolymer or α-methylstyrene/acrylonitrile/styrene interpolymer.

These plasticized blends have a much different character than the unplasticized blends. Particularly, they have a much widened transition range, and the temperature at which they change from a stiff rigid solid to a rubbery solid, indicated by $T_f$ of the Clash-Berg test, is very greatly lowered, as is their $T_{2000}$ temperature. Naturally their tensile and flexural strengths are much lower than those of the unplasticized blends, but their tensile elongation is much higher.

For comparison, data for the same physical properties of a blend of 76 parts by weight polyvinyl chloride with 24 parts by weight dioctyl phthalate plasticizer are included in Table II.

strength is considerably better even than that of the polyvinyl chloride plus dioctyl phthalate material containing no copolymer or terpolymer. Further, the marked loss in tensile elongation experienced on adding styrene/acrylonitrile copolymer to the plasticized polyvinyl chloride does not occur when α-methylstyrene is also used.

EXAMPLE 3

In this example are reported the results of tests on compression molded samples of blends of 95 parts by weight polyvinyl chloride with 5 parts by weight of either emulsion polymerized styrene/acrylonitrile copolymer or emulsion polymerized α-methylstyrene/acrylonitrile/styrene terpolymers containing varying proportions of the three monomers.

In comparing these data with the data of Example 1, it is to be noted that in Example 1 the blends contained 10 percent of the interpolymers, whereas in the present Example 3, the blends contained 5 percent of the interpolymers.

As in Example 1, the composition of 72 parts by weight styrene/28 parts by weight acrylonitrile used in the copolymer was that composition which gave, in the final blend with polyvinyl chloride, the best physical properties. Data for this blend are given in the first line of

Table II

BLENDS OF 66 PARTS POLYVINYL CHLORIDE WITH 10 PARTS COPOLYMERS OR TERPOLYMERS, PLASTICIZED WITH 24 PARTS DIOCTYL PHTHALATE

| Interpolymer Composition, Wt. Percent of Monomeric Components | | | Tensile Strength,[1] p.s.i. | | Tensile Elong., Percent (Failure) | Flexural Strength, p.s.i. | Clash-Berg, ° C. | | |
|---|---|---|---|---|---|---|---|---|---|
| αMS | AN | S | Yield | Failure | | | $T_f$ | $T_{2000}$ | Stifflex Range |
| (³) | --- | --- | (²) | 3,374 | 205.6 | 1,303 | 1.2 | 40.5 | 39.3 |
| --- | 28 | 72 | (²) | 2,941 | 120.8 | 1,457 | 3.6 | 53.1 | 49.5 |
| 5 | 25 | 70 | (²) | 3,299 | 231.9 | 2,168 | 8.2 | 46.9 | 38.7 |
| 10 | 30 | 60 | (²) | 3,763 | 197.9 | 2,773 | 15.1 | 50.9 | 35.8 |
| 20 | 30 | 50 | (²) | 3,079 | -------- | 2,025 | 8.0 | 48.2 | 40.2 |

αMS = α-Methylstyrene.
AN = Acrylonitrile.
S = Styrene.
[1] Crosshead speed 1 inch per minute.
[2] No yield point.
[3] No interpolymer.

Examination of the data in the first two lines of Table II shows the effect of adding styrene/acrylonitrile copolymer to polyvinyl chloride plasticized with dioctyl phthalate. The flexural strength is somewhat improved, as is the transition range (Stifflex range) but the tensile strength and tensile elongation are both markedly poorer.

In comparison, use of α-methylstyrene in conjunction with styrene and acrylonitrile to produce a terpolymer which is blended with the polyvinyl chloride plus dioctyl phthalate plasticizer, gives in each instance in which 5, 10 and 20 percent α-methylstyrene was present in the terpolymer, a blend having much higher flexural strength than either the plasticized polyvinyl chloride or the same also containing the styrene/acrylonitrile copolymer. Thus, the product containing the terpolymer is much stronger than that containing the copolymer or containing no added copolymer or terpolymer. Further, the loss in tensile strength resulting from addition of the styrene/acrylonitrile copolymer to the plasticized polyvinyl chloride, is not experienced to an appreciable degree with the 5 percent α-methylstyrene material, is experienced to some extent with the 20 percent α-methylstyrene material but less than that with the styrene/acrylonitrile copolymer, and with the 10 percent α-methylstyrene material the tensile Table III. The data in the next four lines of Table III were obtained on blends of 95 parts by weight polyvinyl chloride with 5 parts by weight α-methylstyrene/acrylonitrile/styrene terpolymer containing, respectively, 5, 15, 25, and 35 parts by weight α-methylstyrene in the terpolymer. The relative proportions of acrylonitrile and styrene were chosen so that the overall composition of the terpolymer in each instance lay on what can be termed the "azeotropic line," viz. the straight line which joins together the composition of the binary polymerization azeotrope of acrylonitrile and styrene on the one hand, and the composition of the binary polymerization azeotrope of acrylonitrile and α-methylstyrene on the other hand when plotted on a triangular coordinate graph. In contrast, the blends for which data are given in the last five lines of Table II, were made up from various α-methylstyrene/acrylonitrile/styrene terpolymers in which the percentage of α-methylstyrene was maintained constant at 15 weight percent while the relative proportions of acrylonitrile and styrene were varied so that the acrylonitrile content increased regularly by 5 percent intervals, so that the compositions of the five different terpolymers when plotted on the triangular coordinate graph just mentioned, cut across the azeotropic line.

Table III
UNPLASTICIZED BLENDS OF 95% POLYVINYL CHLORIDE WITH 5% COPOLYMERS OR TERPOLYMERS

| Interpolymer Composition, Wt. Percent of Monomeric Components | | | Tensile Strength, p.s.i. | | Tensile Elong., Percent Failure | | Flexural Strength, p.s.i.° | Impact Strength, ft. lbs/in. notch |
|---|---|---|---|---|---|---|---|---|
| αMS | AN | S | Yield | Failure | Max. | Avg. | | |
| ---- | 28 | 72 | 7,300 | 5,800 | ---- | 39 | 13,800 | .52 |
| 5 | 24 | 71 | 8,300 | 7,700 | >100 | 71 | 15,400 | .57 |
| 15 | 25 | 60 | 8,200 | 6,600 | 117 | 81 | 13,500 | .43 |
| 25 | 26 | 49 | b 8,300 | b 7,100 | 103 | b 71 | 14,500 | .54 |
| 35 | 27 | 38 | a 8,300 | a 6,200 | 76 | a 62 | 14,300 | .54 |
| 15 | 15 | 70 | 8,200 | 6,800 | 23 | 16 | 13,200 | .69 |
| 15 | 20 | 65 | c 8,200 | c 7,700 | 104 | c 96 | 13,800 | .55 |
| 15 | 25 | 60 | 8,200 | 6,600 | 117 | 81 | 13,500 | .43 |
| 15 | 30 | 55 | 8,400 | c 7,100 | 13 | c 12 | 14,300 | .54 |
| 15 | 35 | 50 | ------ | d 8,400 | 7 | d 7 | 14,000 | .54 |

αMS = α-Methylstyrene.
AN = Acrylonitrile.
S = Styrene.
a Average of two specimens which yielded. Two specimens broke before yielding.
b Average of three specimens which yielded. One specimen broke before yielding.
c Average of two specimens which yielded. One specimen broke before yielding.
d Average of three specimens which broke before yielding. No specimens yielded.
e Yield. No failure.

It will be seen that all of the blends of polyvinyl chloride with 5 parts by weight of the various α-methylstyrene/acrylonitrile/styrene terpolymers, had greater tensile strength at yield and at failure than did the corresponding blend of polyvinyl chloride with 5 percent of styrene/acrylonitrile copolymer; the flexural strengths were all satisfactory. Also, most of the terpolymer blends had higher tensile elongation than the blend with the copolymer. It is particularly interesting to note that the blends made from terpolymers whose compositions are taken from the "azeotropic line" have the highest tensile elongations, as compared with the blends made from terpolymers whose compositions are not on the azeotropic line. This is seen particularly well from the data in the last 5 lines of the table, in which the compositions are taken from a constant 15 percent α-methylstyrene line cutting across the azeotropic line. The third composition in this group, i.e., three lines from the bottom of the table, containing 15 parts by weight α-methylstyrene, 25 parts by weight acrylonitrile and 60 parts by weight styrene, lies on the azeotropic line. Also, the data in the earlier part of the table in which the terpolymer compositions were taken from the azeotropic line, show the tensile elongations to be consistently high although they tend to decrease as the percentage of α-methylstyrene becomes high.

Not shown in the numerical data given in Table III is the increased compatibility with polyvinyl chloride of the α-methylstyrene/acrylonitrile/styrene terpolymers as compared with the styrene/acrylonitrile copolymer. The high degree of compatibility of the terpolymers with polyvinyl chloride gave transparent moldings with very little haze.

The blends of this example had excellent processing characteristics.

While the invention has been described with particular reference to various preferred embodiments, and examples have been given of suitable materials, proportions and conditions, it will be appreciated that variations from the details given herein can be effected without departing from the invention.

This application is a continuation-in-part of our copending application Serial No. 280,400, filed April 3, 1952, now abandoned.

We claim:

1. An intimate mixture of (a) from 75 to 99 parts by weight of a vinyl chloride polymer and (b) correspondingly from 25 to 1 part by weight of an α-methylstyrene/acrylonitrile/styrene interpolymer, said interpolymer containing α-methylstyrene, acrylonitrile and styrene in the following weight proportions:

α-Methylstyrene _____ 2 to 50
Acrylonitrile _____ 10 to 40
Styrene _____ 10 to 88 with the total of said weight proportions equalling 100.

2. An intimate mixture of (a) from 75 to 99 parts by weight of a vinyl chloride polymer and (b) correspondingly from 25 to 1 part by weight of an α-methylstyrene/acrylonitrile/styrene interpolymer, said interpolymer containing α-methylstyrene, acrylonitrile and styrene in the following weight proportions:

α-Methylstyrene _____ 2 to 50
Acrylonitrile _____ 17 to 33
Styrene _____ 17 to 81 with the total of said weight proportions equalling 100.

3. An intimate mixture of (a) from 75 to 99 parts by weight of a vinyl chloride polymer and (b) correspondingly from 25 to 1 part by weight of an α-methylstyrene/acrylonitrile/styrene interpolymer, said interpolymer containing α-methylstyrene, acrylonitrile and styrene in the following weight proportions:

α-Methylstyrene _____ 2 to 40
Acrylonitrile _____ 17 to 33
Styrene _____ 27 to 81 with the total of said weight proportions equalling 100.

4. A composition according to claim 1 containing from 10 to 60 parts by weight dioctyl phthalate as plasticizer.

5. A composition according to claim 1 free from liquid plasticizer.

6. A composition according to claim 1 wherein said vinyl chloride polymer is a homopolymer of vinyl chloride.

7. A composition according to claim 2 wherein said vinyl chloride polymer is a homopolymer of vinyl chloride.

8. A composition according to claim 1 wherein said vinyl chloride polymer is an interpolymer of vinyl chloride with at least one other mono-olefinic monomer copolymerizable therewith and contains a major proportion of vinyl chloride.

9. A composition according to claim 2 wherein said vinyl chloride polymer is an interpolymer of vinyl chloride with at least one other mono-olefinic monomer copolymerizable therewith and contains a major proportion of vinyl chloride.

10. A composition according to claim 3 wherein said vinyl chloride polymer is an interpolymer of vinyl chloride with at least one other mono-olefinic monomer copolymerizable therewith and contains at least 85 weight percent vinyl chloride.

11. An unplasticized intimate mixture of (a) about 90 percent by weight of polyvinyl chloride and (b) about 10 percent by weight of a terpolymer of about 30 percent by weight of acrylonitrile with about 50–60 percent by weight of styrene and correspondingly, about 20–10 percent by weight of α-methylstyrene.

12. An intimate mixture of (a) from 85 to 98 parts by weight of a vinyl chloride polymer and (b) correspondingly from 15 to 2 parts by weight of an α-methylstyrene/acrylonitrile/styrene interpolymer, said interpolymer containing α-methylstyrene, acrylonitrile and styrene in the following weight proportions:

| | |
|---|---|
| α-Methylstyrene | 2 to 50 |
| Acrylonitrile | 10 to 40 |
| Styrene | 10 to 88 | with the total of said weight proportions equalling 100.

13. An intimate mixture of (a) from 85 to 98 parts by weight of a vinyl chloride polymer and (b) correspondingly from 15 to 2 parts by weight of an α-methylstyrene/acrylonitrile/styrene interpolymer, said interpolymer containing α-methylstyrene, acryonitrile and styrene in the following weight proportions:

| | |
|---|---|
| α-Methylstyrene | 2 to 50 |
| Acrylonitrile | 17 to 33 |
| Styrene | 17 to 81 | with the total of said weight proportions equalling 100.

14. An intimate mixture of (a) from 85 to 98 parts by weight of a vinyl chloride polymer and (b) correspondingly, from 15 to 2 parts by weight of an α-methylstyrene/acrylonitrile/styrene interpolymer, said interpolymer containing α-methylstyrene, acrylonitrile and styrene in the following weight proportions:

| | |
|---|---|
| α-Methylstyrene | 2 to 50 |
| Acrylonitrile | 17 to 33 |
| Styrene | 17 to 81 | with the total of said weight proportions equalling 100.

15. A composition according to claim 14 wherein said vinyl chloride polymer is a homopolymer of vinyl chloride.

16. A composition according to claim 14 wherein said vinyl chloride polymer is an interpolymer of vinyl chloride with at least one other mono-olefinic monomer copolymerizable therewith and contains a major proportion of vinyl chloride.

17. An intimate mixture of a vinyl chloride polymer and an α-methylstyrene/acrylonitrile/styrene interpolymer, said interpolymer containing α-methylstyrene, acrylonitrile and styrene in the following weight proportions:

| | |
|---|---|
| α-Methylstyrene | 2 to 50 |
| Acrylonitrile | 10 to 40 |
| Styrene | 10 to 88 | with the total of said weight proportions equalling 100.

18. A composition according to claim 1 obtained by effecting the polymerization resulting in the formation of said vinyl chloride polymer while said α-methylstyrene/acrylonitrile/styrene interpolymer is present in preformed state.

19. A composition according to claim 1 obtained by effecting the polymerization resulting in the formation of said α-methylstyrene/acrylonitrile/styrene interpolymer while said vinyl chloride polymer is present in preformed state.

References Cited in the file of this patent

UNITED STATES PATENTS 2,646,417    Jennings _____ July 21, 1953